United States Patent [19]

Bancroft

[11] Patent Number: 5,060,859

[45] Date of Patent: Oct. 29, 1991

[54] IRRIGATION CONTROL APPARATUS RESPONSIVE TO SOIL MOISTURE

[75] Inventor: Richard H. Bancroft, Riverside, Calif.

[73] Assignee: The Toro Company, Minneapolis, Minn.

[21] Appl. No.: 463,602

[22] Filed: Jan. 11, 1990

[51] Int. Cl.$^5$ ............................................. A01G 25/16
[52] U.S. Cl. ........................................ 239/64; 239/69; 239/70; 239/71; 137/78.3
[58] Field of Search ................... 239/63, 64, 67, 69, 239/70, 71; 137/78.2, 78.3

[56] References Cited

U.S. PATENT DOCUMENTS

| | | | |
|---|---|---|---|
| 3,238,392 | 3/1966 | Richards | 239/63 X |
| 3,361,356 | 1/1968 | Johnson et al. | 239/63 X |
| 3,782,179 | 1/1974 | Richards . | |
| 3,808,385 | 4/1974 | Klinefelter . | |
| 3,991,375 | 11/1976 | Riggs et al. | 239/64 X |
| 4,513,608 | 4/1985 | Cuming . | |
| 4,569,020 | 2/1986 | Snoddy et al. | 239/69 X |
| 4,646,224 | 2/1987 | Ransburg et al. | 239/63 X |
| 4,657,039 | 4/1987 | Bireley et al. | 239/64 X |
| 4,718,446 | 1/1988 | Simpson | 239/64 X |
| 4,796,654 | 1/1989 | Simpson | 239/64 X |
| 4,837,499 | 6/1989 | Scherer . | |
| 4,892,113 | 1/1990 | Fattahi | 239/64 X |
| 4,936,333 | 6/1990 | Bireley | 137/78.3 |
| 4,937,732 | 6/1990 | Brundisihi | 239/69 X |

FOREIGN PATENT DOCUMENTS 1097238  6/1984  U.S.S.R. ............................... 239/63

OTHER PUBLICATIONS

Landscape & Irrigation, Oct. 1987, pp. 102 and 105.
Landscape & Irrigation, Oct. 1987, pp. 79 and 82–83.
Landscape & Irrigation, Oct. 1987, pp. 94, 95, 98 and unknown pg. (cont. from p. 98).
Sunset, May 1988, pp. 270 and 271.

*Primary Examiner*—Andres Kashnikow
*Assistant Examiner*—William Grant
*Attorney, Agent, or Firm*—James W. Miller

[57] ABSTRACT

An improved irrigation control apparatus for use in controlling an irrigation valve. The apparatus includes a soil moisture sensor for generating an output signal indicative of the soil moisture level. The output signal is sent to a control unit that inhibits valve operation if the soil is considered wet. The control unit has a control circuit that applies a relatively short duration power pulse to the sensor to obtain a moisture reading during the pulse. In addition, the control unit includes display lights which are part of a manually actuable test circuit that displays a wet or dry soil indication received from the sensor.

15 Claims, 4 Drawing Sheets 5,060,859

IRRIGATION CONTROL APPARATUS RESPONSIVE TO SOIL MOISTURE

TECHNICAL FIELD

This invention relates to an apparatus which controls the actuation of a valve in an irrigation system. More particularly, this invention relates to a control apparatus to keep the valve from opening when the level of soil moisture exceeds a predetermined amount, i.e. the soil is considered "wet".

BACKGROUND OF THE INVENTION

Irrigation systems are well known for applying water to turf areas for maintaining the turf or vegetation growing there. Such systems include sprinklers distributed over the area, valves for controlling the flow of pressurized water to the sprinklers from underground water supply pipes, and an irrigation controller for operating the valves in accordance with a desired irrigation cycle stored in the controller. The controller often includes solid state logic means which allows the user to input and store practically any desired irrigation cycle.

Many known irrigation controllers operate automatically as time elapses to turn the sprinkler valves on and off at designated intervals without taking actual environmental conditions, i.e. actual soil moisture, into account. However, this is wasteful and unduly expensive as it uses water which may not be needed. In some cases, the irrigation controller includes a rain switch to stop an irrigation cycle when it is raining. While useful, this is not an exact measure of soil moisture and can potentially stop an irrigation cycle that may be needed despite the rain.

Interest has grown recently in soil moisture sensing technology in which the soil moisture level is measured directly and is used to control the irrigation process. Various types of soil moisture sensors have been proposed, including some which interface directly with an irrigation controller or valve to apply a control function. Such sensors usually provide a soil moisture reading when an input voltage is applied to them.

However, one drawback of many such sensors is their tendency to rather quickly degrade or corrode. In Applicant's opinion, the electrical power applied to them induces an eletrochemical reaction which eventually causes an increase in sensor resistance, rendering the sensor virtually useless. While much effort has been directed to sensor construction and design, not much effort has gone into looking at the control circuits used in combination with the sensor for a solution to the corrosion problem.

In addition, the irrigation industry has been somewhat reluctant to widely adopt moisture sensing technology due to a fear that it might fail and harm the area being irrigated. The prevailing thought is that it is better to apply too much water than not enough. This fear has been intensified because prior art control units for use with moisture sensors are little more than "black boxes". One basically has to trust that the sensor and control unit are performing properly. The only external check most users have is visual observation of the soil condition. However, users often misinterpret such visual observation and interrupt or terminate the use of the soil moisture sensor prematurely.

SUMMARY OF THE INVENTION

One aspect of this invention is an irrigation control apparatus responsive to soil moisture which minimizes sensor corrosion and provides display means the operator can use to increase his confidence in the operation of the apparatus.

Accordingly, an improved irrigation control apparatus according to this invention is designed for use in controlling the operation of an electrically operated irrigation valve. The apparatus comprises a soil moisture sensor suited to be at least partially buried in the ground. The sensor has means for generating an output voltage when an input voltage is applied to an electrically conductive moisture sensing element in the sensor. The output voltage varies with the level of moisture in the soil.

In addition, the control apparatus includes a control unit which may be connected to the soil moisture sensor and a source of electrical power. The control unit comprises control circuit means having sensor input means for applying the input voltage to the sensor, logic means operatively connected to the sensor and responsive to the output voltage from the sensor for generating a wet soil signal or a dry soil signal depending on the relative level of soil moisture, and valve control means operatively connected to the logic means for allowing operation of the valve if a dry soil signal is sent by the logic means and for preventing operation of the valve if a wet soil signal is sent by the logic means. The control unit further includes display circuit means operatively connected to the logic means for providing a sensory indication to the operator of either a wet soil condition or a dry soil condition.

Another aspect of this invention relates to an improved irrigation control apparatus having a soil moisture sensor of the type described above. A control unit is again operatively connected to the sensor and to an electrical power source for controlling the operation of an irrigation valve. The control unit has control circuit means for applying a relatively short duration pulse of power to the moisture sensing element of the sensor to obtain a sensor output signal only during the pulse, whereby corrosion of the sensor is minimized.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
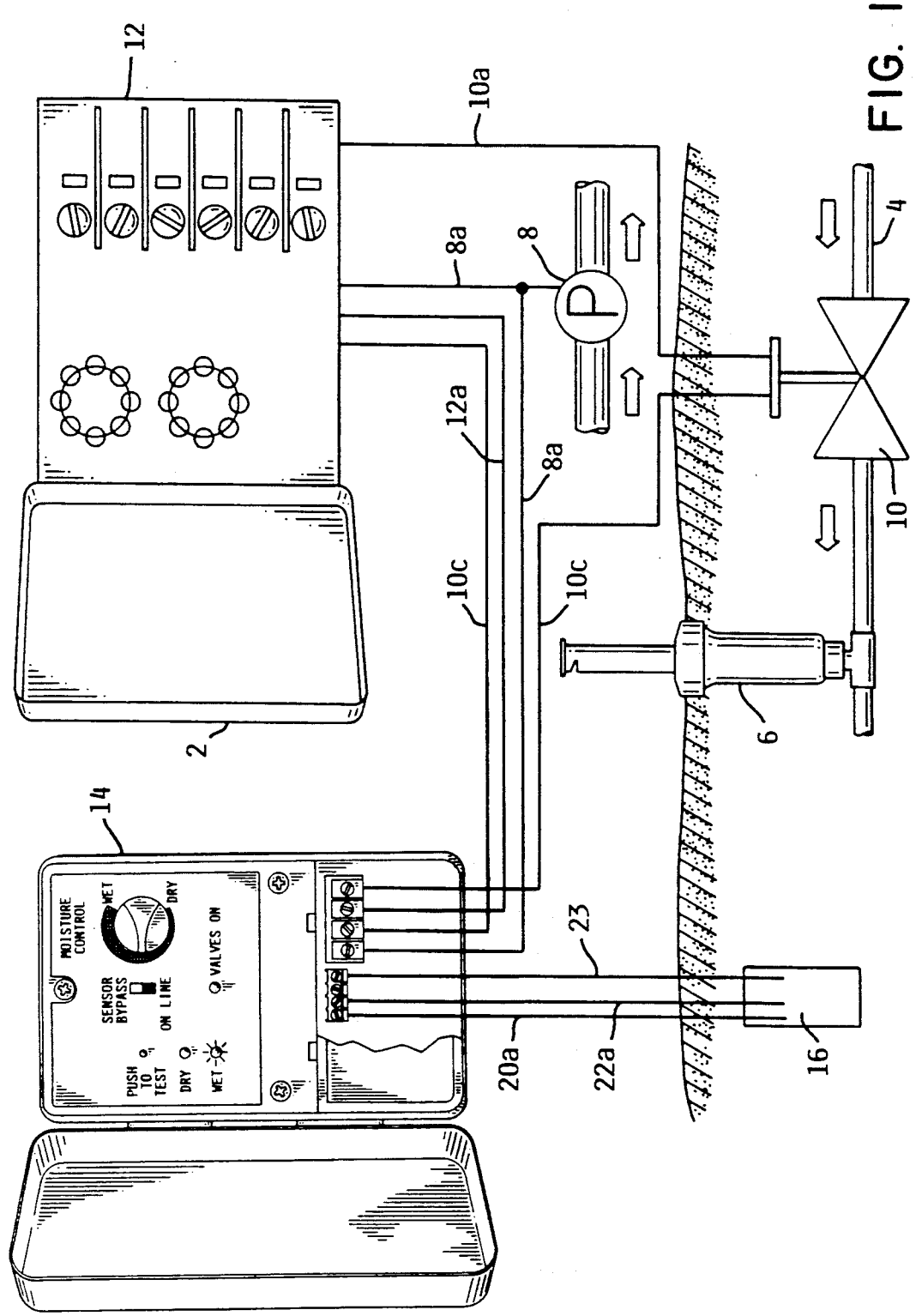
FIG. 1 is an elevational view of an irrigation system having the improved irrigation control apparatus of this invention installed therein, particularly illustrating the moisture sensor buried in the ground and the control unit connected to the moisture sensor and to various components of the irrigation system.

A typical irrigation system 2 has an array of underground pipes 4 carrying water to various sprinkler heads 6. A pump 8 fills pipes 4 with water under pressure whenever the pump is running. However, not all sprinkler heads 6 in system 2 normally operate at once. Instead, a set of control valves 10 supply sprinkler heads 6 with water in sequential groups.

As shown in FIG. 1, one valve 10 can control a single sprinkler head 6. However, it is more usual for one valve 10 to feed a plurality of sprinkler heads 6 whose water needs are related, e.g. they are watering the same turf area. This group of related sprinkler heads 6 controlled by a single valve 10 is known as a "station" in the overall irrigation system.

While it was once common to manually turn sprinkler valves 10 on and off, an automatic irrigation controller 12 is now typically part of irrigation system 2. Such a controller 12 is basically a sophisticated timer that automatically turns valves 10 on and off. Valves 10, which are solenoid operated, are "opened" for as long as they receive a 24V A.C. control output signal from controller 12 and are otherwise closed. Controller 12 can usually be programmed to select the following characteristics of valve operation:
  what days valve 10 will operate during a particular irrigation cycle, e.g. only on Tuesdays and Thursdays for each one or two week cycle,
  what time of day valve 10 will operate, e.g. at 7 a.m. and 8 p.m., and
  the run time for valve 10, e.g. 20 minutes.

Controller 12 supplies 24 V A.C. power to both pump 8 and valves 10 along suitable output lines 8a and 10a to activate these components in accordance with the programmed irrigation sequence. Pump 8 runs whenever any irrigation cycle is to take place to pressurize pipes 4 and controller 12 opens and closes the individual valves 10 at appropriate times. In some cases for large irrigation systems, pump 8 might, in fact, be a master valve (not shown) which is turned on and off to pressurize just those pipes 4 leading to valves 10 served by the master valve. In addition, controller 12 is also able to provide 24V A.C. power continuously, regardless of pump 8 or master valve operation, along another output line 12a. As will be described later, both of these sources of 24V A.C. power, i.e. pump output line 8a and controller output line 12a, will be used in conjunction with this invention.

The present invention relates to improved irrigation control apparatus to further control operation of valves 10 in accordance with the amount of moisture present in the soil. Preferably, the control apparatus operates in concert with time-based controller 12 to inhibit operation of valves 10 when sufficient soil moisture is present and to enable operation of valves 10 when the soil is dry. In other words, controller 12 functions normally to turn valves 10 on and off at the appropriate programmed times. The control apparatus simply overrides controller 12 when the soil does not require watering.

The irrigation control apparatus of this invention comprises a control unit 14 and a soil moisture sensor 16. The function of sensor 16 is to sense or "read" the level of moisture in the soil and communicate that level to control unit 14. Control unit 14 then compares the actual soil moisture level to a desired level to determine if the soil is "wet", i.e. the moisture level is at or above the desired level, or "dry", i.e. the actual level is below the desired level. If a wet reading is obtained by control unit 14, control unit 14 prevents valve 10 from opening even though irrigation controller 12 may be calling for that action.

In this regard, the valve common lines 10c (i.e. the ground lines) which would normally lead directly to controller 12 now are connected to controller 12 through a normally closed relay 18 in control unit 14. The purpose of control unit 14 is to open relay 18 when a "wet" soil condition is present, thereby breaking or shorting the circuit powering valves 10. Thus, with valve common line 10c being open, valves 10 will not operate even if controller 12 is sending 24V A.C. power to them. Alternatively, relay 18 could be placed in the station output line 10a used to supply power to valve 10 as opposed to being in the common lines 10c.

The use of a normally closed relay 18 is important. It provides control unit 14 with "fail-safe" operation as most control unit 14 failures will involve a failure to properly open relay 18. However, even if this happens, relay 18 simply stays closed and valves 10 are operated normally by controller 12. Thus, while more water than is needed might be applied to the ground during a control unit 14 failure, the potentially catastrophic situation of no water being applied is avoided. This is all the more important since control unit 14 might be located in a remote part of irrigation system 2 and be basically unattended. Since failure of an unattended control unit 14 might not be detected for some time, user confidence is enhanced by the knowledge that normal operation of valves 10 will not be impaired by such failure.

Control unit 14 incorporates a number of improvements. It includes improved control circuit means for operating soil moisture sensor 16 and for opening relay 18 when a "wet" soil condition is present. It also includes improved display circuit means which give the user important diagnostic capabilities. The control circuit means will be described first beginning with a description of sensor 16 with which the control circuit means is designed to operate.

Sensor 16 is desirably a "powered" sensor 16 in that it receives an input voltage from control unit 14 and sends back an output voltage that is indicative of the actual soil moisture level. The output voltage will vary depending on the level of moisture in the soil. Since sensor 16 output voltage is also affected by changes in soil temperature or salinity, sensor 16 is preferably of the type disclosed in U.S. Pat. No. 3,782,179 to Richards, which factors out changes in soil temperature or salinity. The Richards patent is incorporated herein by reference.

As taught in the Richards patent, sensor 16 includes two ceramic soil moisture sensing bodies each having an electrode therein. Basically, these two bodies comprise resistors 20 and 22 which react identically to changes in soil temperature or salinity, but differently to changes in actual soil moisture due to different pore sizes in the ceramic compositions of the two bodies. Sensor 16 is connected to control unit 14 by two input lines 20a and 22a which apply an input voltage to resistors 20 and 22 respectively. An output line 23 located at the junction of the two resistors reads back an output voltage to control unit 14 which represents the ratio of the resistance sensed by resistor 20 to that sensed by the other resistor 22, i.e. R20/R22. This ratio changes only when the soil moisture level changes, and not because of changes in salinity or temperature.

Figure 2:
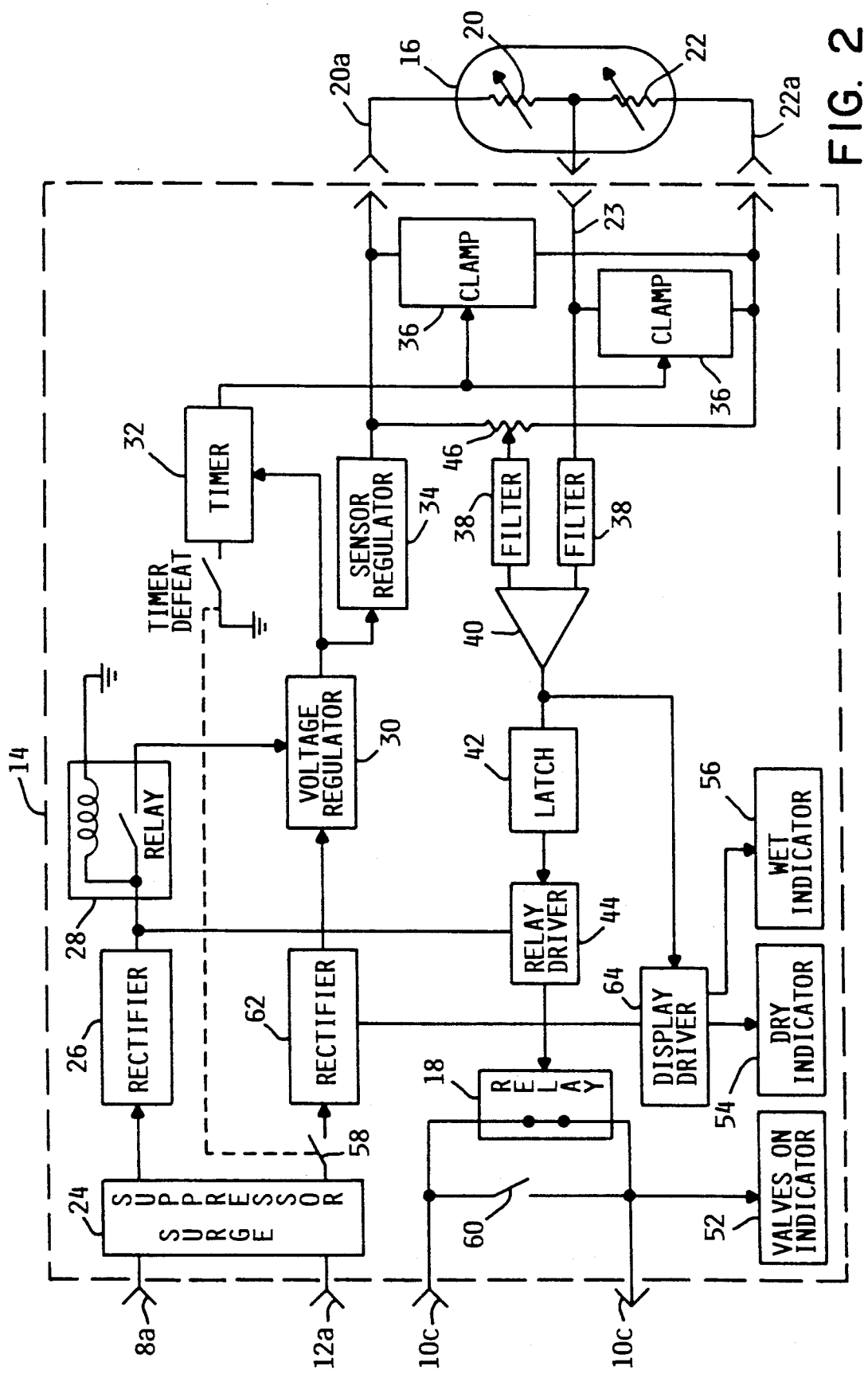
FIG. 2 is a block diagram of the electrical circuits contained in the control unit of this invention, particularly illustrating the control circuit means and the display circuit means.

Continuing with the description of the control circuit means, FIG. 2 shows a block diagram of control unit 14. The control circuit means is normally powered by the pump or master valve output line 8a on controller 12. As noted previously, line 8a is always activated at the beginning of every irrigation cycle and is maintained until the last station has timed out. Line 8a is brought into control unit 14 through a surge suppression circuit 24, which protects control unit 14 from voltage surges or spikes, particularly those caused by lightning. While controller 12 may itself have a built-in surge suppressor, control unit 14 may be installed at a considerable distance from controller 12, making the lines running to control unit 14 vulnerable to surges from lightning strikes.

The incoming 24V A.C. power to control unit 14 is next rectified by a rectifier 26, whose output is an unregulated 24V D.C. used to directly power a normally open relay 28. The application of the 24V D.C. will close relay 28 to apply the 24V D.C. to a voltage regulator 30 which reduces the voltage to a lower level for activating a timer 32. In addition, the output of voltage regulator 30 is applied to both resistors 20 and 22 in sensor 16 to power sensor 16. If necessary, an additional voltage regulator 34 is used to further reduce the voltage to sensor 16 to a relatively low level (approximately 2.5V D.C.).

The application of DC regulated power from voltage regulator 30 to timer 32 starts a 1 second time delay running. At the conclusion of this short time delay, timer 32 activates clamping circuits 36 across both sensor resistors 20 and 22 shorting out the input voltage to resistors 20 and 22. However, during this short duration pulse of DC voltage across sensor 16, the output voltage is sampled at the junction of resistors 20 and 22 to indicate the level of moisture in the soil. In the configuration shown, the drier the soil, the lower the output voltage, and vice versa.

While the sensor output voltage can be read from sensor 16 only in the period of time before timer 32 times out, it is immediately applied through a low pass noise filter 38 to one input of a logic device comprising a voltage comparator 40. The sensor output voltage is compared against a reference voltage and comparator 40 sends a "wet" or "dry" output signal depending on the results, i.e. a "wet" signal if sensor output voltage is equal to or above the reference voltage or a "dry" signal if sensor output voltage is below the reference voltage. A latch 42 will hold the output state of comparator 40 even after timer 32 times out and removes power from sensor 16. Latch 42 will hold comparator 40 output state until power is completely removed from control unit 14. If a "wet" signal has been received from comparator 40, latch 42 causes a relay driver 44 to apply power from input 8a to relay 18 to open the contacts thereof, thereby opening valve common line 10c as previously discussed and preventing irrigation through valves 10.

A fixed reference voltage can be used in comparator 40 if desired. However, the reference voltage is desirably made to be adjustable by using an infinitely adjustable potentiometer 46 to input the reference voltage into comparator 40. Potentiometer 46 is adjustable by manually rotating a knob 48 on the control panel 50 of control unit 14. Potentiometer 46 gives the user a certain desirable feeling of control, especially in combination with the display circuit means described hereafter.

As described thus far, control unit 14 provides important added control features in the usual irrigation system 2. In addition to the normal time-based control provided by controller 12, control unit 14 now further controls the irrigation cycle in accordance with the actual level of moisture in the soil. If the soil is already sufficiently wet, control unit 14 will prevent valves 10 from opening, thereby conserving water. Water conservation is a desirable goal, both in terms of lowering the expense of operating the system 2 and also in conserving an increasingly scarce natural resource.

In addition, the control circuit means contained in unit 14 advantageously prevents or resists the corrosion of the electrodes contained in sensor 16 even though DC power is applied to sensor 16. Prior art devices have typically used A.C. power because it was believed that the application of D.C. would quickly corrode the electrodes and make sensor 16 inoperative. A.C. was thought to be less deleterious than D.C. since the opposed parts of the A.C. cycle would first plate and then unplate the electrode. But, in practice, A.C. also causes electrode corrosion, although perhaps not as quickly as D.C.

However, Applicant realized that continuous sensor readings are not required from sensor 16. In this configuration, one only needs to know the moisture level at the time valve 10 would ordinarily be turned on. Thus, Applicant realized he could mitigate the corrosion problem if sensor 16 is powered only in short bursts at the time a reading is required. This is accomplished as noted above.

In addition, Applicant believes that another source of electrode corrosion is low level voltage which leaks down to control unit 14 through controller output lines 8a even when such lines are not powered. Though this voltage is of an extremely low level, it can over time also corrode or plate the sensor electrodes. However, the use of normally open relay 28 prevents this since it isolates sensor 16 from such leaked voltage, i.e. relay 28 can be closed only by the application of the higher voltage present when output lines 8a are activated by controller 12. Accordingly, this feature, especially in combination with the pulsed application of power to sensor 16, will increase sensor life and reliability.

Figure 3:
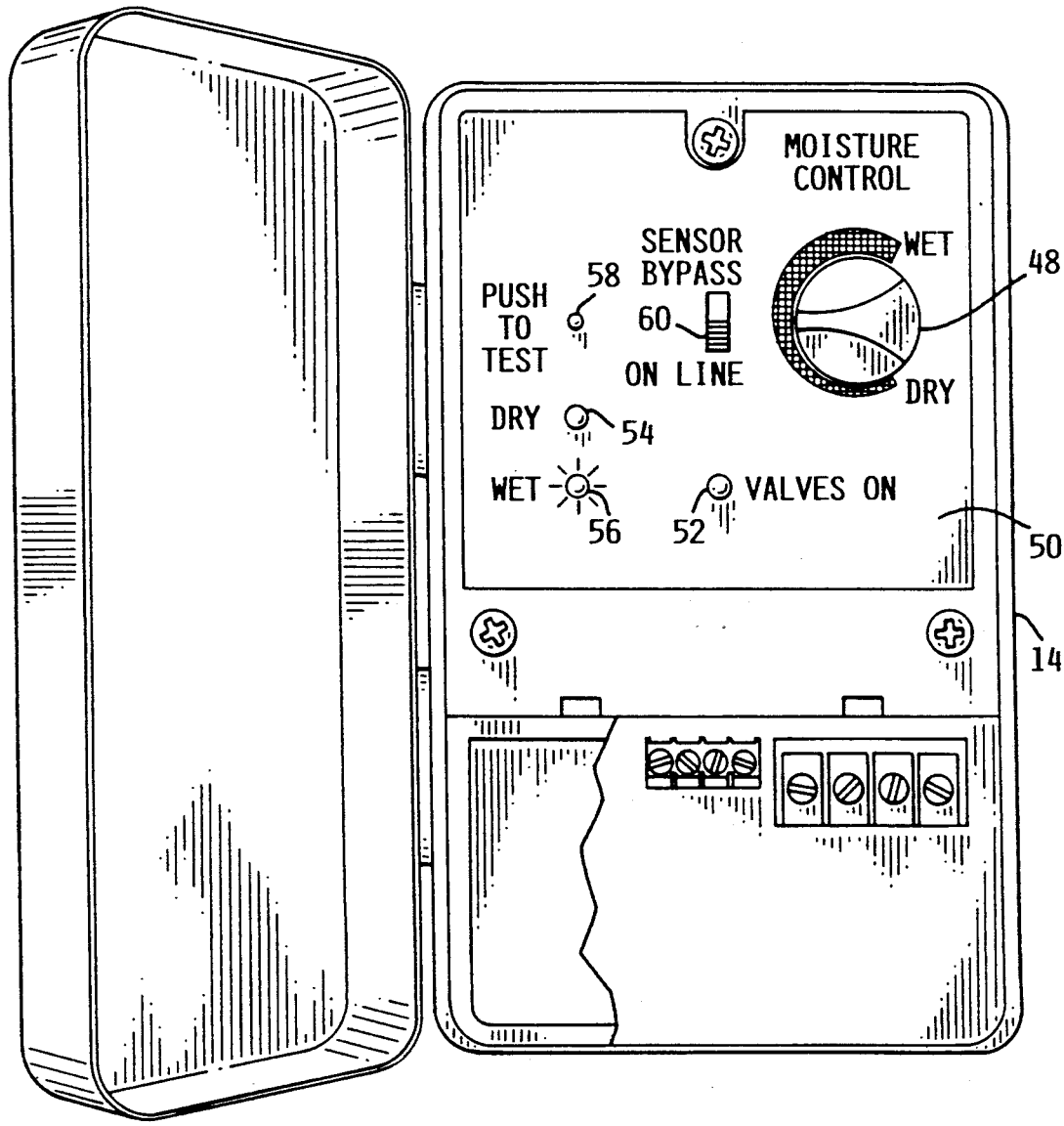
FIG. 3 is a perspective view of the control panel of the control unit of this invention, particularly illustrating a first position for the potentiomenter knob and a "wet" soil signal indication derived when activating the display circuit means of the control unit with the knob in the first position shown.
Figure 4:
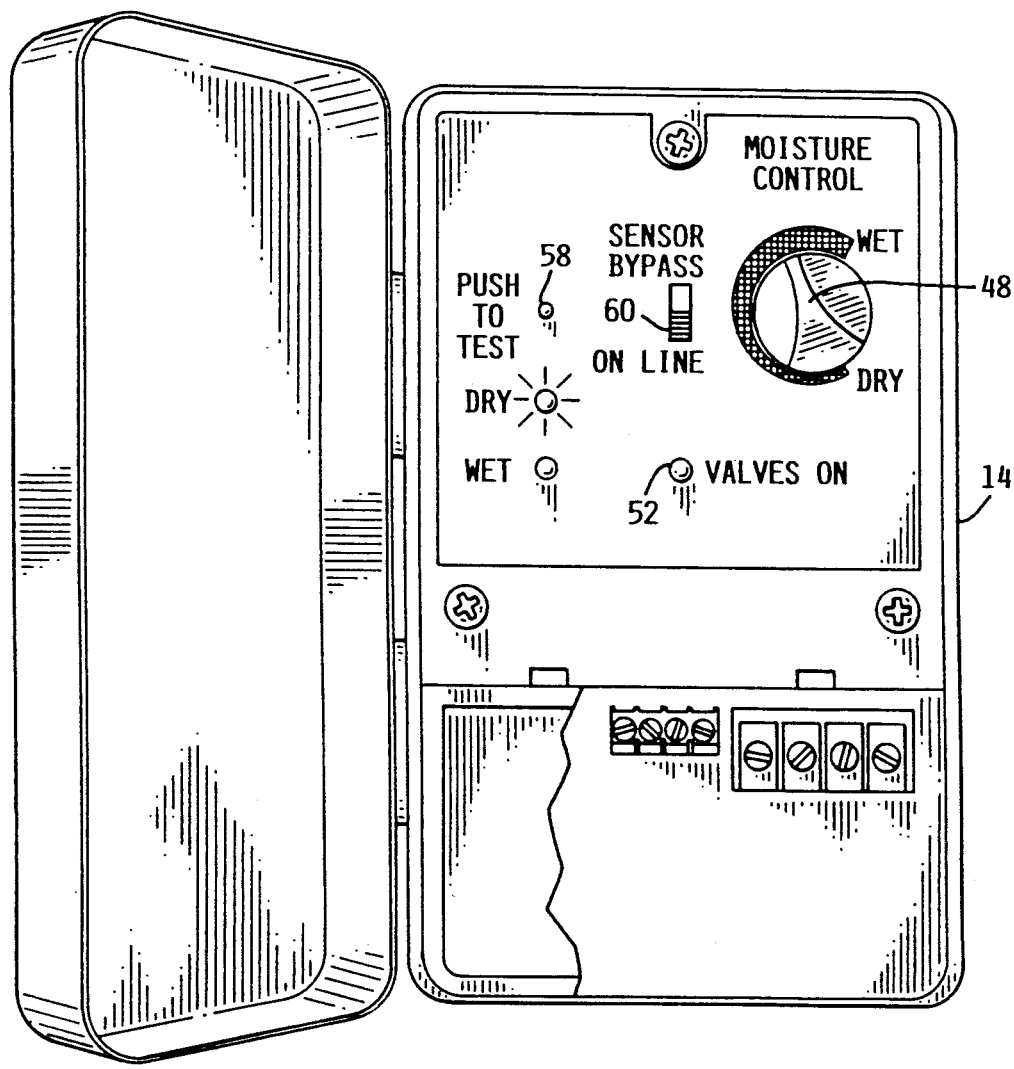
FIG. 4 is a perspective view of the control panel of the control unit similar to FIG. 3, but illustrating a second position for the potentiomenter knob and a "dry" soil signal indication derived in a subsequent activation of the display circuit means of the control unit with the knob in the second position shown.

Turning now to the display circuit means present, reference should first be had to FIGS. 3 and 4 which illustrate control panel 50 of control unit 14. In addition to potentiometer adjustment knob 48, panel 50 includes a number of display lights as follows: a "valves on" light 52 comprising a red LED, a "dry" light 54 comprising a yellow LED, and a "wet" light 56 comprising a green LED. In addition, a "test" push button switch 58 is present as well as a two position bypass slide switch 60 for taking control unit 14 on or off line.

The test and display features of control unit 14 are directed primarily to making the user feel more comfortable with and confident in using soil moisture sensing and control technology to automatically control an irrigation system 2. Currently, there is some resistance in the irrigation industry to turning control of an irrigation system 2 over to a "black box" which is supposed to be monitoring soil moisture levels. The owners of such irrigation systems are understandably loathe to risk the health of the turf being irrigated to such a box. However, control unit 14 of this invention is designed to be more user friendly, to provide more feedback to the user, and thus to be more accepted.

Referring now to FIG. 2, the operation of bypass switch 60 is straightforward. When switch 60 is in the "on line" position as shown in FIGS. 3 or 4, switch 60 will be open and control unit 14 will function as described above to control valve 10 operation. However, if the operator wishes to take control unit 14 off line, then he simply slides switch 60 to the "sensor bypass" position. In this position, the contacts of switch 60 are closed to continuously close valve common line 10c, regardless of what action control unit 14 is calling for. Thus, switch 60 can be used by the operator to manually override control unit 14.

Test switch 58 can be used whenever the operator wishes to get a visual indication of how sensor 16 views the soil moisture level. For example, when push button switch 58 is depressed by the operator, the display circuit means is powered by 24V A.C. power from controller output line 12a. Output line 12a is active regardless of whether or not the irrigation controller 12 is conducting an irrigation cycle. This power will be applied through a rectifier 62 to voltage regulator 30 to power sensor 16 and generate a "wet" or "dry" signal from comparator 40. This signal is fed to a display driver 64 to illuminate either the "wet" or "dry" indicator light as appropriate. In this display cycle, depression of switch 58 activates a timer defeat so timer 32 will not time out giving the user a continuous display of the soil condition for as long as switch 58 is activated. Moreover, depression of switch 58 does not power relay driver 44 so that valve control is not initiated by a display operation.

Thus, by pushing and holding the test switch 58, the operator can tell whether sensor 16 thinks the soil is "wet" or "dry". The operator can then compare this sensor reading with whatever other external evidence is available regarding the actual soil condition. For example, if it has just rained heavily and sensor 16 indicates "wet", then the operator will have more comfort that sensor 16 and control unit 14 are operating properly, and may decide to leave control unit 14 on line.

The use of adjustable potentiometer 46 is also quite valuable in terms of enhancing operator confidence in control unit 14. First, it allows the operator to pick the relative level of soil wetness at which control unit 14 will operate without depending on a pre-set factory calibration. This is particularly important since consistent factory calibration of sensors 16 may be difficult to achieve. With potentiometer 46, the operator can observe the condition of the turf and adjust as needed to suit the operator's individual preference For example, if control unit 14 is keeping the soil somewhat drier than the operator would like, then the operator would merely rotate potentiometer knob 48 to increase the reference voltage, i.e. the "dry" condition would now be sensed at a higher relative moisture level in the soil.

In addition, potentiometer 46, in combination with the wet and dry indicator lights 54 and 56, can be easily used by the operator to determine when control unit 14 might next allow the sprinklers to operate. In this regard, suppose the operator begins a test routine and the "wet" indicator light flashes at a midpoint position of potentiometer knob 48, as shown in FIG. 3. If the operator observes that the soil appears dry and is nervous or uncertain about the operation of control unit 14, he can then keep switch 58 depressed and rotate knob 48 until "wet" indicator light 56 winks out and "dry" indicator light 54 comes on, as shown in FIG. 4. If knob 48 is turned only a short distance before this happens, then the operator can expect irrigation system 2 to begin irrigating very soon. This may help the operator confirm that the original setting of potentiometer 46 was correct and need not be disturbed. Alternatively, if a large amount of knob rotation is required to get the lights to switch, then the operator would probably conclude that potentiometer 46 setting was incorrect and needed to be changed.

Finally, the "valves on" indicator light 52 is connected to the valve common line 10c and should be illuminated whenever the controller 12 is in an irrigation cycle and either relay 18 or bypass switch 60 is closed. In this condition, with light 52 on, power is being fed from controller 12 through control unit 14 to valves 10. The selected valves 10 should have opened and the sprinklers operated by valves 10 should be running. If they are not, then a fault exists in the valves 10 in question or the conductors leading to valves 10.

Thus, control unit 14 of this invention has numerous display circuit means which help a user to determine whether the control apparatus of this invention is operating properly. This in turn will help the user to trust the control apparatus more and to be assured that it will work to conserve water without damaging the turf areas being irrigated. These are valuable results to achieve.

Various modifications of this invention will be apparent to those skilled in the art. For example, different moisture control sensors, or different sources of power for sensor 16 shown herein, could be used as long as sensor 16 provides an output control signal indicative of the level of soil moisture. Thus, the scope of the present invention is to be limited only by the appended claims.

I claim:

1. An improved irrigation control apparatus for use by an operator in controlling the operation of an electrically operated irrigation valve, which comprises:
   (a) a soil moisture sensor suited to be at least partially buried in the ground, the sensor having means for generating an output voltage when an input voltage is applied to an electrically conductive moisture sensing element in the sensor, the output voltage varying with the level of moisture in the soil; and
   (b) a control unit suited to be operatively connected to the soil moisture sensor and a source of electrical power for controlling the operation of the valve in accordance with the soil moisture level, the control unit comprising:
      (i) control circuit means having sensor input means for applying the input voltage to the sensor, logic means operatively connected to the sensor and responsive to the output voltage from the sensor for generating a wet soil signal or a dry soil signal depending on the relative level of soil moisture, and valve control means operatively connected to the logic means for allowing operation of the valve if a dry soil signal is sent by the logic means and for preventing operation of the valve if a wet soil signal is sent by the logic means;
      (ii) a first power input operatively connected to the control circuit means;
      (iii) means for applying electrical power to the first power input only during an irrigation cycle so that the control circuit means is activated only during such cycle;

(iv) display circuit means operatively connected to the logic means for providing a sensory indication to the operator of either a wet soil condition or a dry soil condition;

(v) a second power input operatively connected to the display circuit means by a selectively operable test switch; and (vi) means for continuously applying power to the second power input so that the display circuit means may be activated at any time by closing the test switch, wherein the control circuit means is separately actuable from the display circuit means.

2. An improved irrigation control apparatus as recited in claim 1, wherein the sensory indication is a visual indication.

3. An improved irrigation control apparatus as recited in claim 2, wherein the display circuit means comprises wet and dry indicator lights.

4. An improved irrigation control apparatus as recited in claim 1, wherein the control circuit means includes timer means for applying a timed pulse of input voltage to the sensor and deriving the output voltage from the sensor only during the pulse.

5. An improved irrigation control apparatus as recited in claim 4, wherein the input voltage comprises DC voltage.

6. An improved irrigation control apparatus as recited in claim 1, further including manually operable means for changing the soil moisture level required to generate a wet soil signal from the logic means, wherein the manually operable means and the display circuit means are simultaneously actuable, wherein the manually operable means can be manipulated from a starting position until the operator observes a change in the soil condition indication provided by the display circuit means, thereby providing to the operator a measure of how far the actual soil moisture level currently varies from the level represented by the starting position of the manually operable means.

7. An improved irrigation control apparatus as recited in claim 6, wherein the logic means comprises a comparator having one input operatively connected to the sensor for receiving the sensor output voltage and a second input operatively connected to a variable resistor for supplying a reference voltage, the comparator having means for comparing the sensor output voltage against the reference voltage and for generating the wet soil signal if the sensor output voltage is equal to or above the reference voltage and the dry soil signal if the sensor output voltage is less than the reference voltage, and wherein the resistance of the resistor can be selectively changed by the operator to vary the reference voltage, thereby changing the soil moisture level needed to generate the wet soil signal from the comparator.

8. An improved irrigation control apparatus as recited in claim 7, wherein the variable resistor comprises a variable potentiometer.

9. An improved irrigation control apparatus as recited in claim 1, wherein the valve control means comprises:

(a) a normally closed relay means for supplying electrical power to the valve; and (b) means operatively connected to the logic means for receiving the wet or dry soil signal therefrom and for opening the normally closed relay means in response to a wet soil signal only, whereby electrical power is discontinued to the valve only in response to a wet soil signal from the logic means, otherwise leaving the valve in an operative condition.

10. An improved irrigation control apparatus as recited in claim 1, wherein the display circuit means is also operatively coupled to the sensor input means of the control circuit means for powering the sensor from the second power input when the test switch is closed for obtaining the wet or dry soil signal from the logic means used by the display means in providing the appropriate sensory indication.

11. An improved irrigation control apparatus for use by an operator in controlling operation of an electrically operated valve in an irrigation system for irrigating a particular soil area, which comprises:

(a) means for sensing the level of moisture in the soil area to be irrigated; and (b) a control unit operatively connected to the moisture sensing means and to an electrical power source for controlling the operation of the valve in accordance with the level of moisture in the soil, the control unit comprising:

(i) control circuit means for sampling the level of moisture in the soil using the moisture sensing means and for opening the valve to allow irrigation to take place if the soil is dry compared to a reference value but otherwise for closing the valve to prevent irrigation if the soil is wet compared to the reference value; and (ii) display circuit means for sampling the level of moisture in the soil using the moisture sensing means and for providing a sensory indication to the operator of whether the soil is wet or dry, and wherein the display circuit means is selectively operable by the operator independently of the control circuit means to allow the operator to poll the moisture sensing means and display the wet or dry condition of the soil even if the control circuit means is not operable at that time.

12. An improved irrigation control apparatus as recited in claim 11, wherein the display circuit means includes wet and dry indicator lights.

13. An improved irrigation control apparatus as recited in claim 11, further including manually operable means for selectively changing the reference value used by the moisture sensing means in determining whether the soil is wet or dry, wherein the manually operable means and the display circuit means are simultaneously actuable whenever the display circuit means is selectively operated, wherein the manually operable means can be manipulated from a starting position until the operator observes a change in the indication provided by the display circuit means, thereby providing to the operator a measure of how far the actual soil moisture level currently varies from the level represented by the starting position of the manually operable means.

14. An improved irrigation control apparatus as recited in claim 11, wherein the display circuit means is also operatively coupled to the control circuit means to allow the control circuit means to drive the display circuit means and indicate the wet or dry condition of the soil to the operator during operation of the control circuit means.

15. An improved irrigation control apparatus as recited in claim 11, further including means for applying electrical power to the control circuit means only during an irrigation cycle so that the control circuit means is intermittently activated only during such irrigation cycles, and further including means for continuously applying electrical power to the display circuit means.

* * * * *